United States Patent [19]
Kang et al.

[11] Patent Number: 5,650,129
[45] Date of Patent: Jul. 22, 1997

[54] LIGHT WEIGHT SILICA BALLS WITH A DENSE OUTER LAYER AND METHOD OF MAKING THE SAME

[75] Inventors: Thae-Khapp Kang; Seok-Jin Oh; Sun-Jae Kim; Choong-Hwan Jung; Il-Hyun Kuk, all of Daejeon-Si, Rep. of Korea

[73] Assignees: Korea Atomic Energy Research Institute, Daejeon-Si; Korea Electric Power Corporation, Seoul, both of Rep. of Korea

[21] Appl. No.: 587,564

[22] Filed: Jan. 17, 1996

Related U.S. Application Data

[63] Continuation-in-part of Ser. No. 291,854, Aug. 17, 1994, abandoned.

[30] Foreign Application Priority Data

May 3, 1994 [KR] Rep. of Korea .................. 94-9707

[51] Int. Cl.$^6$ ................................................ C01B 33/12
[52] U.S. Cl. ............................................... 423/335
[58] Field of Search ................................. 423/335

[56] References Cited

U.S. PATENT DOCUMENTS

| | | | |
|---|---|---|---|
| 2,161,186 | 6/1939 | Morgan et al. | 423/335 |
| 2,699,376 | 1/1955 | Hay | 423/335 |
| 3,493,341 | 2/1970 | Le Page et al. | 423/335 |
| 4,857,290 | 8/1989 | Shimizu | 423/335 |
| 4,913,966 | 4/1990 | Garvey et al. | 423/335 |
| 5,063,179 | 11/1991 | Menashi et al. | 423/335 |
| 5,354,548 | 10/1994 | Araya et al. | 423/335 |

FOREIGN PATENT DOCUMENTS

| | | | |
|---|---|---|---|
| 679525 | 8/1979 | U.S.S.R. | 423/335 |
| 1292328 | 10/1972 | United Kingdom | 423/335 |

*Primary Examiner*—Wayne Langel
*Attorney, Agent, or Firm*—Nikaido Marmelstein Murray & Oram LLP

[57] ABSTRACT

The present invention provides silica balls in a spherical shape, the silica balls having a porous internal structure and a dense outside layer.

5 Claims, 4 Drawing Sheets

LIGHT WEIGHT SILICA BALLS WITH A DENSE OUTER LAYER AND METHOD OF MAKING THE SAME

This is a continuation-in-part of application Ser. No. 291,854, filed on Aug. 17, 1994, now abandoned.

FIELD OF THE INVENTION

The present invention relates to light weight silica balls which are used for manufacturing light concrete and the like, each of which has a highly porous inside structure, and is surrounded by a dense outside layer, with a smooth and even outer surface. More specifically, the present invention relates to silica balls, each of which has a porous inside structure surrounded by a dense outside layer, so that they exhibit a low density in the range of 0.05 to 1.5 g/cm$^3$, and low absorbing characteristics.

SUMMARY OF THE INVENTION

Silica gel particles showing an extremely high specific surface area are used to prepare the silica balls. In preparing silica gel particles by wet chemical process, alkali elements like Na, Al and Fe remain as impurities. During heating the silica gel particles, closure of pores in the outside layer occurs prior to closure on the inside, resulting in a capture of gases inside. The silica gel particles enlarge in size, and become porous and light in weight. Size, shape and microstructures of resulting silica balls can be modified by controlling the properties of the silica gel, such as particle size and impurity content, and the heat-treating temperature.

The shape of silica balls is roughly round and their surfaces are smooth and even. It is an object of the present invention to produce and to provide a method for producing light weight silica balls with a dense outer layer. The light weight silica balls are made of silica gel particles with impurities contents of Na less than 0.4%, calculated as $Na_2O$, Al less than 0.2%, calculated as $Al_2O_3$ and Fe less than 0.02%, calculated as $Fe_2O_3$. The silica gel particles have a particle size of over 10 mesh screen, and are heat-treated at a temperature in the range of 800°–1,100° C. The color of the silica balls is white, and their size is in the range of 2–15 mm in diameter, preferably 3–8 mm. The silica ball is constituted such that the most part consists of a porous structure, and the porous structure is surrounded by a dense outside layer. The outside layer is not porous, and its thickness is uniform. Because of the impermeable dense outside layer, the silica balls float on the water. Further, in the case where the internal pores are well formed, the outside layer is uniform in its thickness, and is very dense.

The thickness of the outside layer is slightly different depending on the diameter of the silica ball, but is usually within the range of several to several hundred micrometers. The internal porous structure has pore size distribution in the range of several to several hundred micrometers, preferably 30–300 micrometers. The pores are separated from each other by thin plates of silica. However, there are some differences depending on the heat treating conditions. Thus, some of the thin plates are cleaved, or, only a porous structure is seen without formation of the thin plates.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
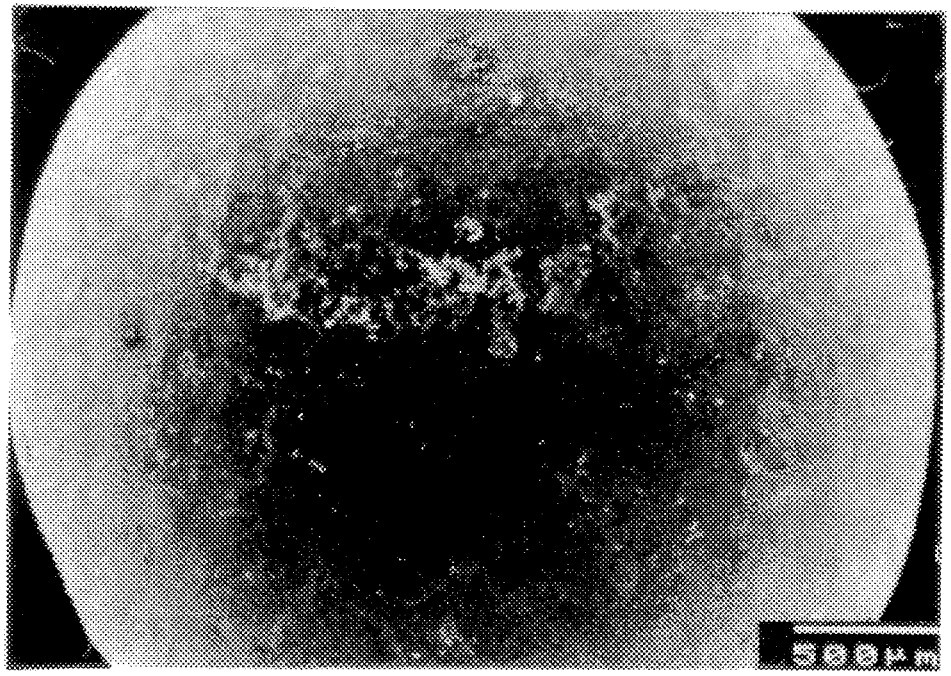
FIG. 1 illustrates the external appearance of the silica balls (with round shape and smooth surface)
Figure 2:
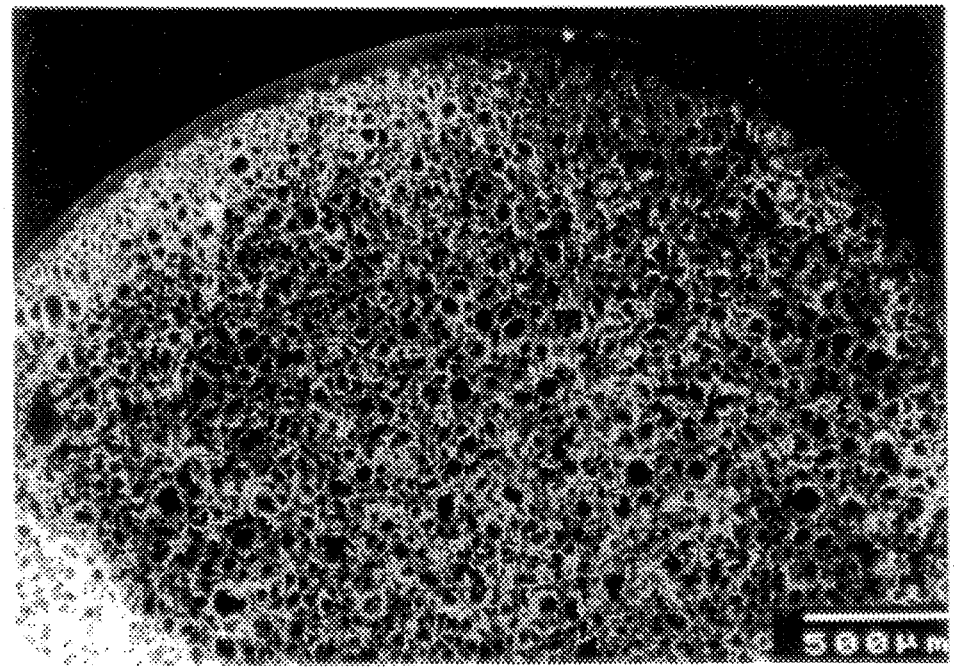
FIG. 2 is a sectional view of one of silica balls (with highly porous internal structure and a thin, dense surrounding outside layer)
Figure 3:
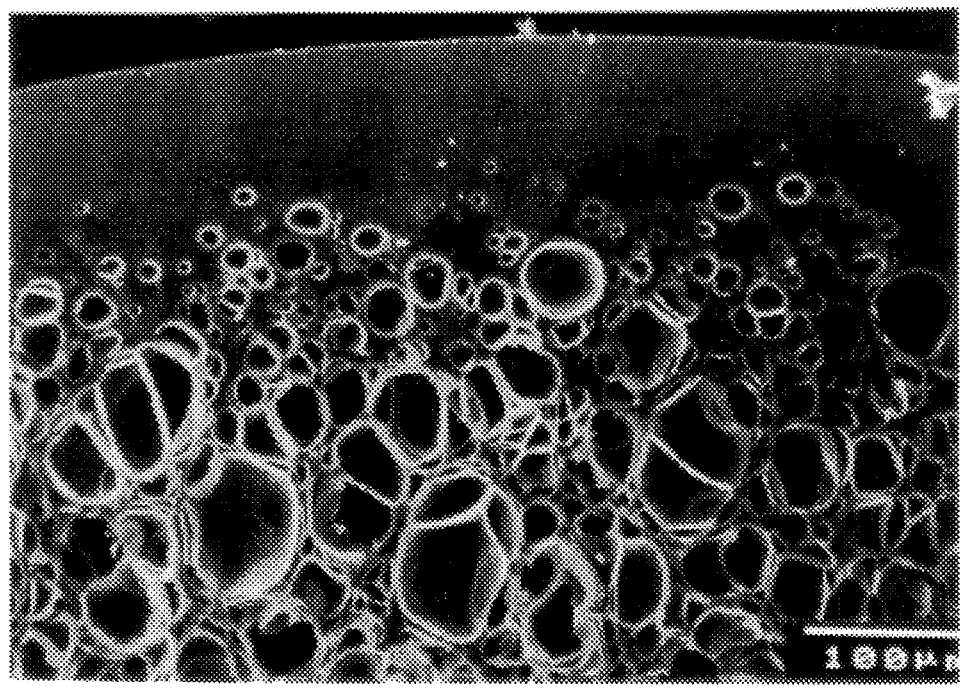
FIG. 3 illustrates a dense outside layer and a porous internal structure.
Figure 4:
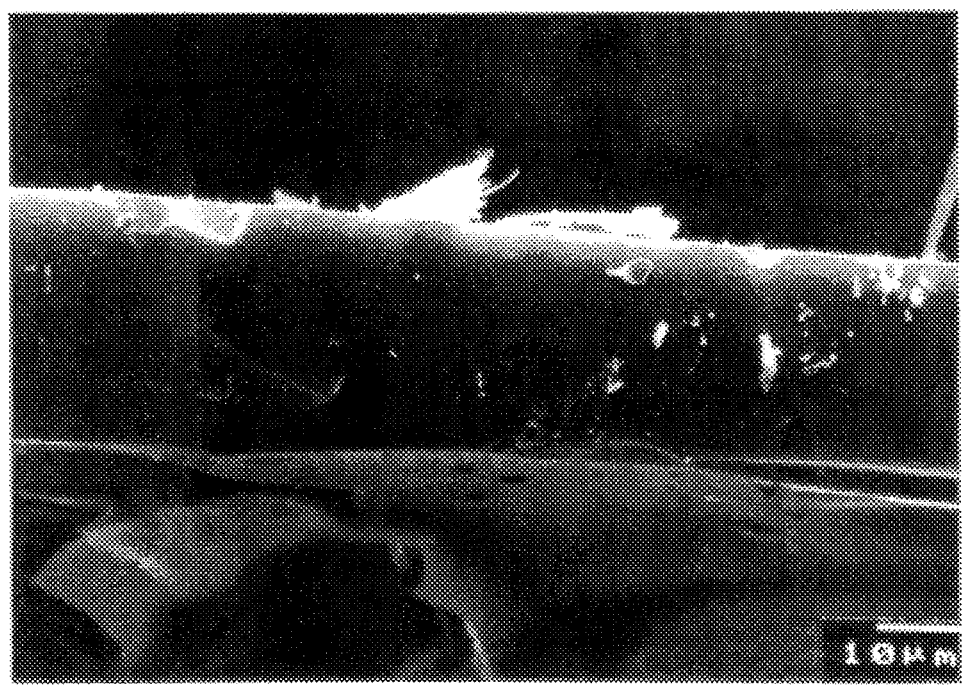
FIG. 4 illustrates the dense and uniform outside layer.
Figure 5:
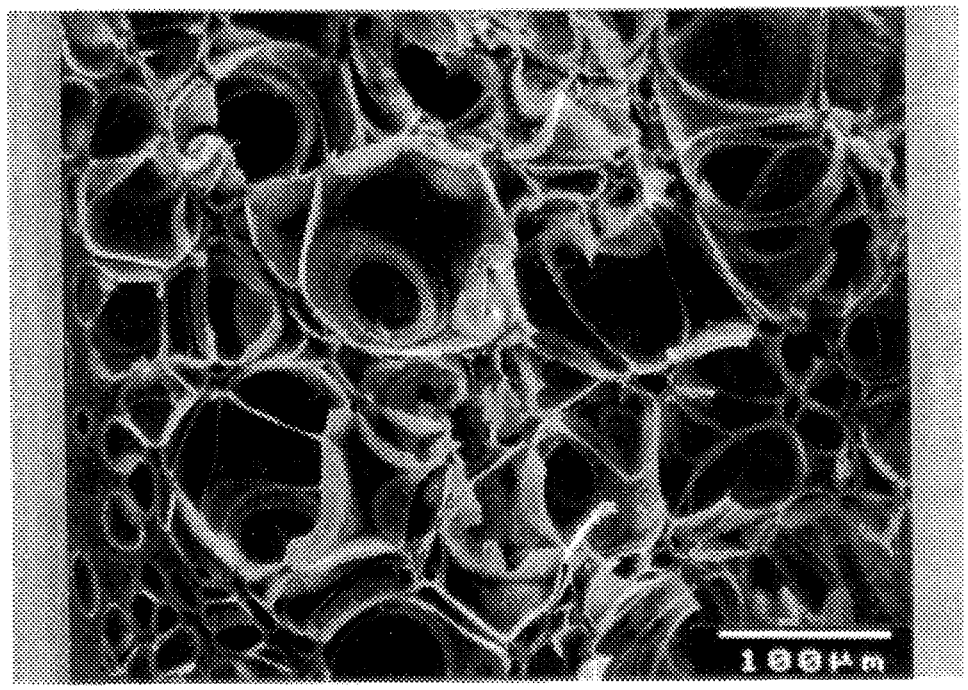
FIG. 5 illustrates the porous internal structure thin plates of silica separating the pores from each other.
Figure 6:
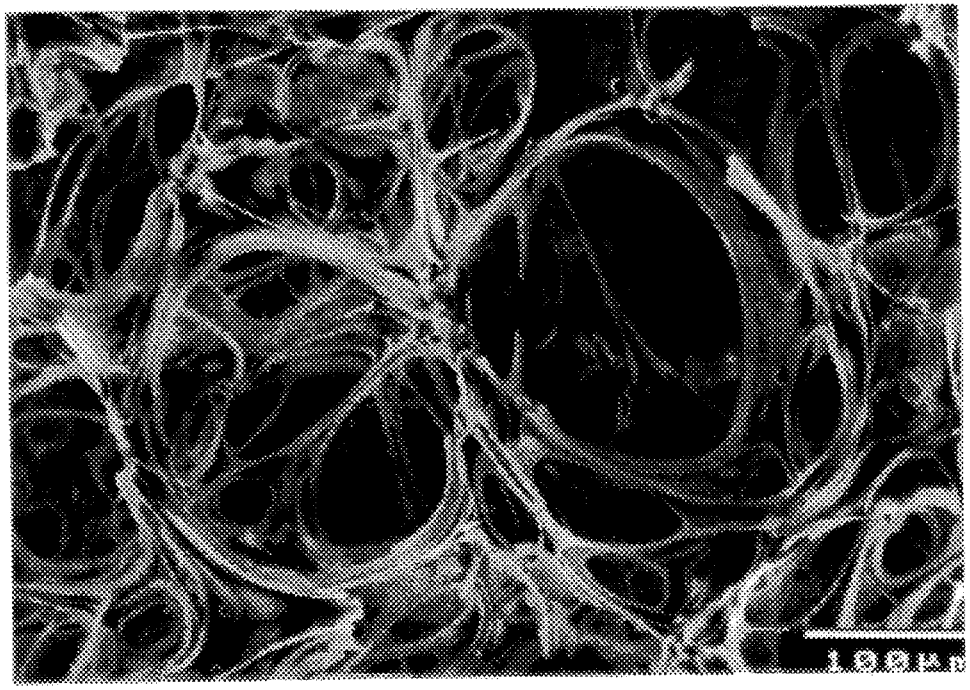
FIG. 6 illustrates the porous internal structure ribbon-like narrow plates of silica between the pores and FIG. 7 illustrates the porous internal structure (porous structure without the thin plates formed).
Figure 7:
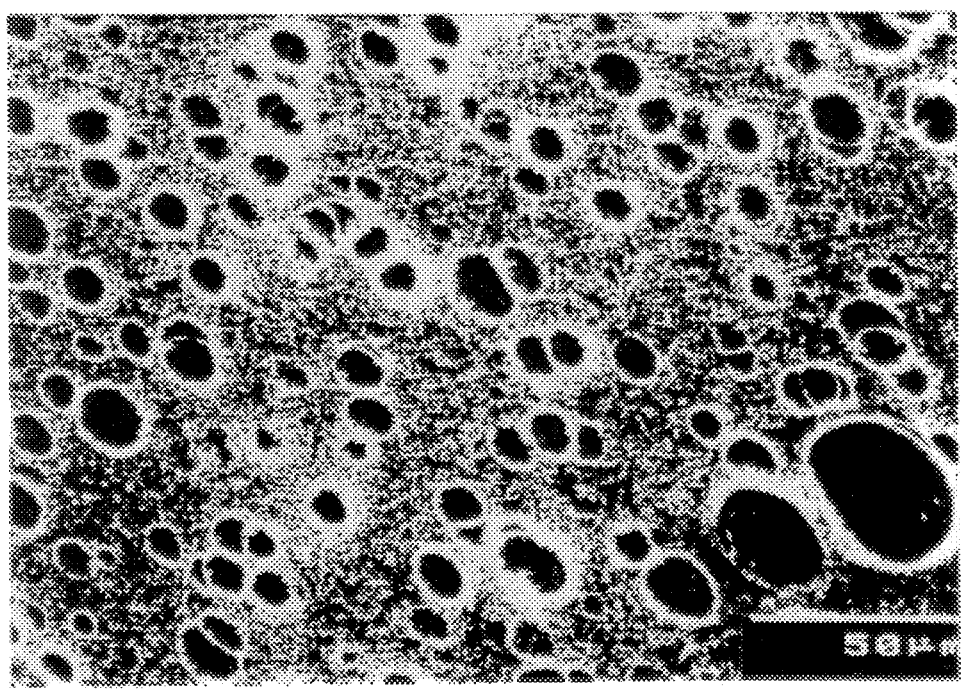

The silica balls of the present invention have a highly porous internal structure with a thin dense outside layer from several to several hundred micrometers in thickness surrounding the pores. The silica balls are of a size in a range of 2–15 mm in diameter. The density of the silica balls shows some differences depending on the sizes, but is usually 0.05–1.5 g/cm$^3$, preferably 0.1–0.4 g/cm$^3$, compared to that of dense silica, which is 2.65 g/cm$^3$. The silica balls are much lighter compared with the general ceramics such as quartz, alumina and the like. The density of the silica balls allows the balls to float on water. The weight of a silica ball is less than 0.2 g, preferably 0.1 g or less.

The silica balls are composed of almost pure silicon dioxide (silica), and the analysis of the composition shows that they include impurities such as Ca, Mg, Cr, Co, Ni, Mn, Cu, Zn, Fe, Al and Na. Of them, Al, Fe and Na are the principal impurities. The raw material used for fabricating the light weight silica balls of the present invention is silica gel particles. The silica gel particles used in the present invention have a size over 10 mesh and have impurities of alkali elements Na, Al and Fe in amounts of less than 0.4%, calculated as $Na_2O$, less than 0.2%, calculated as $Al_2O_3$, and less than 0.02%, calculated as $Fe_2O_3$ by weight, respectively.

In a method of manufacturing light weight silica balls in accordance with the present invention, silica gel particles are put into a heat resistant container made of metals or ceramics, preferably made of oxide ceramics, and then heat treated in a furnace at temperatures in the range of 800°–1,100° C. After such a treatment, the silica gel particles form light weight silica balls with a thin dense outside layer, in accordance with the invention.

The silica balls of the present invention can be used for the case where the weight is to be lowered. That is, by mixing them with cement or concrete, a light construction material can be formed. A light material can be formed by mixing the silica balls with a low melting point metal or alloy, or a plastic material or a ceramic material. Because of the porosity of the silica balls, they are low in the thermal conductivity, so they can be used as a heat insulating material. Thus, the silica balls of the present invention are expected to be used as a light construction material or a light heat insulating material. Further, by utilizing the floating property of the silica balls, they can be formed into a float, or by utilizing the roundness and the white color, they can be formed into decorations and ornamenting articles.

The actual examples of the present invention are as follows.

Example 1 was carried out in the following manner. Silica gel particles having a size over 10 mesh and having impurity levels of alkali elements Na, Al and Fe in amounts of less than 0.4%, calculated as $Na_2O$, less than 0.2%, calculated as $Al_2O_3$ and less than 0.02%, calculated as $Fe_2O_3$, by weight, respectively, were put into a crucible, and it was heated at a rate of 120° C. per hour up to 1100° C. The temperature of 1100° C. was maintained for one hour, thereby carrying out a high temperature heat treatment. Then it was cooled down to the room temperature. The light weight silica balls produced showed characteristics such as: a round shape, white color, 6.9 mm diameter, 0.93 g/cm³ density, an extremely porous inside structure and a thin dense outside layer of 80 micrometers in thickness.

Example 2 was carried out in the same manner as that of Example 1, except that the heating rate was 60° C. per hour. The light weight silica balls produced showed characteristics such as: a round shape, white color, 2.6 mm in diameter, 0.10 g/cm³ density, an extremely porous inside structure and a thin dense outside layer of 250 micrometers in thickness.

What is claimed is:

1. A light weight silica ball comprising silica in a spherical shape having a diameter of 2–15 mm, said silica ball having a porous internal structure with pore sizes in a range of several to several hundred micrometers, a uniform impermeable dense outside layer having a thickness in a range of several to several hundred micrometers, said outside layer surrounding said porous internal structure, and said silica ball having a density in a range of 0.05 to 1.5 g/cm³.

2. A light weight silica ball as claimed in claim 1, wherein said diameter is 3–8 mm.

3. A light weight silica ball as claimed in claim 1, wherein said pore sizes are in a range of 30–300 micrometers.

4. A light weight silica ball as claimed in claim 1, wherein said density is in a range of 0.1–0.4 g/cm³.

5. A light weight silica ball as claimed in claim 1, wherein Al, Fe and Na are contained in said silica ball in amounts of between 0 and 0.2% calculated as $Al_2O_3$, 0 and 0.02% calculated as $Fe_2O_3$ and 0 and 0.4% calculated as $Na_2O$, respectively.

* * * * *